(12) United States Patent
Kim et al.

(10) Patent No.: US 10,540,930 B1
(45) Date of Patent: Jan. 21, 2020

(54) APPARATUS, SYSTEMS, AND METHODS FOR TEMPERATURE-SENSITIVE ILLUMINATION OF LIQUID CRYSTAL DISPLAYS

(71) Applicant: FACEBOOK TECHNOLOGIES, LLC, Menlo Park, CA (US)

(72) Inventors: Cheonhong Kim, Mountain View, CA (US); Evan M. Richards, Fremont, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 56 days.

(21) Appl. No.: 15/863,576

(22) Filed: Jan. 5, 2018

(51) Int. Cl.
  *G09G 3/36* (2006.01)
  *G09G 3/34* (2006.01)
  *G02F 1/13357* (2006.01)
  *G02F 1/1335* (2006.01)

(52) U.S. Cl.
  CPC ......... *G09G 3/3406* (2013.01); *G02F 1/1336* (2013.01); *G09G 3/3674* (2013.01); *G02F 2001/133626* (2013.01); *G09G 2320/0233* (2013.01); *G09G 2320/041* (2013.01)

(58) Field of Classification Search
  CPC ............... G09G 3/3406; G09G 3/3674; G09G 2320/0233; G09G 2320/041; G02F 1/1336; G02F 2001/133626
  See application file for complete search history.

(56) References Cited

U.S. PATENT DOCUMENTS

| 2002/0057241 | A1* | 5/2002 | Oda | G09G 3/2011 345/87 |
| 2009/0073343 | A1* | 3/2009 | Kojima | G09G 3/3406 349/61 |
| 2016/0267715 | A1 | 9/2016 | Patel | |
| 2017/0178565 | A1* | 6/2017 | Fujimaki | G09G 3/2003 |
| 2017/0277000 | A1 | 9/2017 | Shi | |
| 2017/0287408 | A1 | 10/2017 | Shi | |
| 2017/0287409 | A1 | 10/2017 | Richards | |
| 2017/0308161 | A1 | 10/2017 | Richards | |

* cited by examiner

*Primary Examiner* — Towfiq Elahi
(74) *Attorney, Agent, or Firm* — FisherBroyles, LLP

(57) ABSTRACT

A display device may include (1) a liquid crystal (LC) panel with rows of pixel elements that include LC material capable of transitioning between two states, (2) a backlight coupled to the LC panel behind the rows of pixel elements and configured to emit light towards the rows of pixel elements, (3) a temperature sensor configured to measure a temperature of the LC panel, and (4) a display driver configured to (a) scan data to the rows of pixel elements such that the LC material makes a transition between the two states, (b) read, from the temperature sensor, the temperature of the LC panel, (c) calculate, based on the temperature of the LC panel, an estimated transition period for the transition, and (d) initiate, after the estimated transition period, an illumination of the backlight to illuminate the rows of pixel elements. Various other apparatus, systems, and methods are also disclosed.

20 Claims, 11 Drawing Sheets

APPARATUS, SYSTEMS, AND METHODS FOR TEMPERATURE-SENSITIVE ILLUMINATION OF LIQUID CRYSTAL DISPLAYS

BACKGROUND

Virtual reality (VR) and augmented reality (AR) headsets are gaining in popularity for use in a growing number of activities. Such headsets may integrate visual information into a user's field of view to enhance their surroundings or allow them to step into immersive three-dimensional environments. While virtual reality and augmented reality headsets are often utilized for gaming and other entertainment purposes, they are also commonly employed for purposes outside of recreation—for example, governments may use them for military training simulations, doctors may use them to practice surgery, and engineers may use them as visualization aids. Virtual and augmented reality systems are also increasingly recognized for their utility in facilitating interpersonal interactions between individuals in a variety of contexts.

Due to the compact size of many virtual and augmented reality headsets, display screens utilized in such headsets may need to have a small profile while also displaying high-quality, high-resolution images. Since a wearer's eyes may be positioned in relatively close proximity to the display screen, which may be further magnified by lenses of the headset, any inconsistencies in a displayed image may be more readily apparent to a headset user than such inconsistencies in other types of display devices. However, liquid-crystal displays (LCDs), which are often integrated into headsets due to their comparatively lower cost and high availability, may exhibit certain image display issues when operated under various conditions. For example, liquid crystal (LC) responsiveness (i.e., the time taken for LC material to transition from one state or orientation to another) may be decreased at lower temperatures, leading to blurred or double images. With a typical LCD, display data is generally scanned out row by row, and a backlight will generally be set to illuminate when data scanning and LC settling are complete. However, since the time taken for data scanning and LC settling may, at low temperatures, be longer than a frame period, motion blur or double image artifacts may be seen by a user if backlight illumination occurs during data scanning and LC settling. As a result, a user's experience with an LCD headset may be sub-optimal in colder conditions.

SUMMARY

As will be described in greater detail below, the instant disclosure describes various apparatus, systems, and methods for variably illuminating LCDs based on temperature measurements. In one example, a display device may include (1) an LC panel that includes rows of pixel elements that each include liquid crystal material capable of transitioning between two or more states, (2) a backlight coupled to the LC panel behind the rows of pixel elements configured to emit light towards the rows of pixel elements, (3) a temperature sensor configured to measure a temperature of the LC panel, and (4) a display driver configured to (a) scan data to the rows of pixel elements such that the liquid crystal material makes a transition between the two or more states, (b) read, from the temperature sensor, the temperature of the LC panel, (c) calculate, based at least in part on the temperature of the LC panel, an estimated transition period for the transition, and (d) initiate, after the estimated transition period, an illumination of the backlight to illuminate the rows of pixel elements.

In some examples, the LC panel may further include additional rows of pixel elements, the display device may further include an additional backlight coupled to the LC panel behind the additional rows of pixel elements configured to emit light towards the additional rows of pixel elements, and the display driver may be further configured to (1) scan, during a frame period and before scanning the data to the rows of pixel elements, additional data to the additional rows of pixel elements and (2) initiate, during the frame period, an illumination of the additional backlight to illuminate the additional rows of pixel elements. In one example, the display driver may scan the data to the rows of pixel elements during the frame period.

In some examples, the display driver may read the temperature of the LC panel during the frame period. In such examples, the display driver may be further configured to (1) scan, during a subsequent frame period and before scanning new data to the rows of pixel elements, additional new data to the additional rows of pixel elements, (2) initiate, during the subsequent frame period, an additional illumination of the additional backlight, (3) scan, during the subsequent frame period, the new data to the rows of pixel elements such that the liquid crystal material makes an additional transition between the two or more states, (4) read, from the temperature sensor, an updated temperature of the LC panel, (5) calculate, based at least in part on the updated temperature of the LC panel, an additional estimated transition period for the additional transition, and (6) initiate, after the additional estimated transition period, an additional illumination of the backlight. In at least one example, the display driver may read the updated temperature of the LC panel during the subsequent frame period.

In some examples, the end of the transition may occur after the frame period, and the display driver may be configured to initiate the illumnination of the backlight after the estimated transition period by (1) calculating, based at least in part on the temperature of the LC panel, an amount of time between the illumination of the additional backlight and the end of the estimated transition period and (2) delaying the illumination of the backlight for the amount of time after the illumination of the additional backlight. In certain examples, the display driver may be further configured to (1) scan, during a subsequent frame period and before scanning new data to the rows of pixel elements, additional new data to the additional rows of pixel elements, (2) initiate, during the subsequent frame period, an additional illumination of the additional backlight, (3) scan the new data to the rows of pixel elements such that the liquid crystal material makes an additional transition between the two or more states, (4) read, from the temperature sensor, an updated temperature of the LC panel, (5) calculate, based at least in part on the updated temperature of the LC panel, an additional estimated transition period for the additional transition, and (6) initiate, after the additional estimated transition period, an additional illumination of the backlight by (a) calculating an additional amount of time between the additional illumination of the additional backlight and the end of the additional estimated transition period and (b) delaying the additional illumination of the backlight for the additional amount of time after the additional illumination of the additional backlight.

In some examples, the end of the transition may occur during the frame period, and the display driver may be configured to initiate the illumination of the backlight after the estimated transition period by (1) determining, based at least in part on the temperature of the LC panel, that the end of the estimated transition period will occur before the illumination of the additional backlight and (2) causing the illumination of the backlight to occur simultaneous with the illumination of the additional backlight.

In some examples, the display driver may be further configured to (1) scan new data to the rows of pixel elements such that the liquid crystal material makes an additional transition between the two or more states, (2) read an updated temperature of the LC panel, (3) calculate, based at least in part on the updated temperature of the LC panel, an additional estimated transition period for the additional transition, and (4) initiate, after the additional estimated transition period, an additional illumination of the backlight.

In some examples, the display device may be a head-mounted display. In such examples, the liquid crystal panel may further include additional rows of pixel elements that include liquid crystal material capable of transitioning between the two or more states, in some examples, the head-mounted display may further include a lens for a user's eye, an additional lens for the user's other eye, and an additional backlight coupled to the liquid crystal panel behind the additional rows of pixel elements. In these examples, the liquid crystal panel may be coupled to the lens and the additional lens, the rows of pixel elements may be configured to provide images to the user's eye through the lens, the additional rows of pixel elements may be configured to provide additional images to the user's other eye through the additional lens, the backlight may be configured to emit light towards the lens, and the additional backlight may be configured to emit light towards the additional lens.

A corresponding computer-implemented method may include (1) scanning data to rows of pixel elements of an LC panel that include liquid crystal material capable of transitioning between two or more states, (2) reading, from a temperature sensor configured to measure a temperature of the LC panel, the temperature of the LC panel, (3) calculating, based at least in part on the temperature of the LC panel, an estimated transition period for the transition, and (4) initiating, after the estimated transition period, an illumination of a backlight to illuminate the rows of pixel elements.

In some examples, the LC panel may further include (1) additional rows of pixel elements and (2) an additional backlight coupled to the LC panel behind the additional rows of pixel elements and configured to emit light towards the additional rows of pixel elements. In such examples, the computer-implemented method may further include (1) scanning, during a frame period and before scanning the data to the rows of pixel elements, additional data to the additional rows of pixel elements and (2) initiating, during the frame period, an illumination of the additional backlight to illuminate the additional rows of pixel elements. In some examples, the data may be scanned to the rows of pixel elements during the frame period.

In some examples, the temperature of the LC panel may be read during the frame period. In certain examples, the computer-implemented method may further include (1) scanning, during a subsequent frame period and before scanning new data to the rows of pixel elements, additional new data to the additional rows of pixel elements, (2) initiating, during the subsequent frame period, an additional illumination of the additional backlight, (3) scanning, during the subsequent frame period, the new data to the rows of pixel elements, wherein scanning the new data to the rows of pixel elements causes the liquid crystal material to make an additional transition between the two or more states, (4) reading, from the temperature sensor, an updated temperature of the LC panel, (5) calculating, based at least in part on the updated temperature of the LC panel, an additional estimated transition period for the additional transition, and (6) initiating, after the additional estimated transition period, an additional illumination of the backlight. In at least one example, the updated temperature of the LC panel maybe read during the subsequent frame period.

In some examples, the end of the transition may occur after the frame period, and the step of initiating the illumination of the backlight after the estimated transition period may include (1) calculating, based at least in part on the temperature of the LC panel, an amount of time between the illumination of the additional backlight and the end of the estimated transition period and (2) delaying the illumination of the backlight for the amount of time after the illumination of the additional backlight.

In some examples, the computer-implemented method may further include (I) scanning, during a subsequent frame period and before scanning new data to the rows of pixel elements, additional new data to the additional rows of pixel elements, (2) initiating, during the subsequent frame period, an additional illumination of the additional backlight, (3) scanning the new data to the rows of pixel elements, where scanning the new data to the rows of pixel elements causes the liquid crystal material to make an additional transition between the two or more states, (4) reading, from the temperature sensor, an updated temperature of the LC panel, (5) calculating, based at least in part on the updated temperature of the LC panel, an additional estimated transition period for the additional transition, and (6) initiating, after the additional estimated transition period, an additional illumination of the backlight by (a) calculating an additional amount of time between the additional illumination of the additional backlight and the end of the additional estimated transition period and (b) delaying the additional illumination of the backlight for the additional amount of time after the additional illumination of the additional backlight.

In some examples, the end of the transition may occur during the frame period, and the step of initiating the illumination of the backlight after the estimated transition period may include (1) determining, based at least in part on the temperature of the LC panel, that the end of the estimated transition period will occur before the illumination of the additional backlight and (2) causing the illumination of the backlight to occur simultaneous with the illumination of the additional backlight.

In some examples, the computer-implemented method, may further include (1) scanning new data to the rows of pixel elements such that the liquid crystal material makes an additional transition between the two or more states, (2) reading an updated temperature of the LC panel, (3) calculating, based at least in part on the updated temperature of the LC panel, an additional estimated transition period for the additional transition, and (4) initiating, after the additional estimated transition period, an additional illumination of the backlight. In at least one example, the LC panel, the backlight, the temperature sensor, and the display driver may form a portion of a head-mounted display system.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) scan data to rows of pixel elements of an LC panel that include liquid crystal material capable of transitioning between two or more states, (2) read, from a temperature sensor configured to measure a temperature of the LC panel, the temperature of the LC panel, (3) calculate, based at least in part on the temperature of the LC panel, an estimated transition period for the transition, and (4) initiate, after the estimated transition period, an illumination of a backlight to illuminate the rows of pixel elements.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
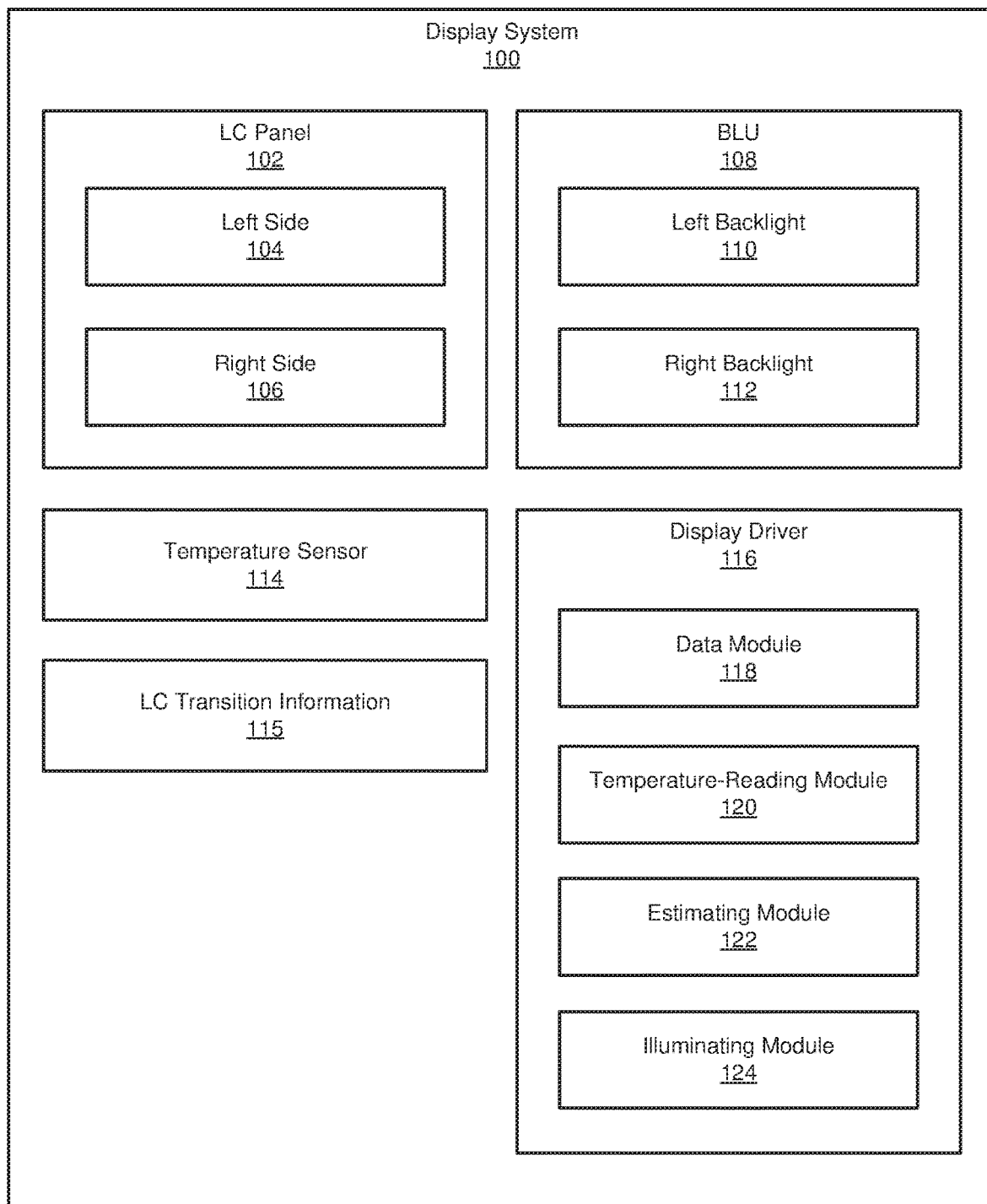
FIG. 1 is a block diagram of an exemplary display system in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for variably illuminating LCDs based on LC panel temperatures. As will be explained in greater detail below, embodiments of the instant disclosure may vary LCD illumination timings to prevent display artifacts. Temperature sensors may be used to determine correct illumination times and rates so that display artifacts can be reduced or eliminated. In some embodiments, an LCD (e.g., an LCD of a HMD) may include (1) an LC panel with two sides and (2) two backlights (e.g., one backlight for each side of the LC panel) that are capable of variable illumination. In some examples, the illumination times and rates for the two backlights may be determined and set independently. At colder operational temperatures, embodiments of the instant disclosure may delay the illumination of one backlight relative to the other to prevent display artifacts. As the operational temperature of the LCD rises, the delay may be shortened until both sides of the display are illuminated simultaneously.

The following will provide, with reference to FIGS. 1-4, examples of head-mounted display systems and devices. In addition, the discussion corresponding to FIGS. 5-11 will provide examples of methods for variably illuminating LCDs based on LC-panel temperatures.

FIG. 1 is a block diagram of an exemplary display system 100 configured to variably illuminate LCDs based on LC-panel temperatures. As illustrated in this figure, example display system 100 may include an LC panel 102, a backlight unit (BLU) 108, a temperature sensor 114, LC transition information 115, and a display driver 116. As shown in this example, LC panel 102 may include a left side 104 and a right side 106. Left side 104 and right side 106 may represent a left portion and a right portion of pixel elements of LC panel 102, respectively. When incorporated in a head-mounted display system, left side 104 and right side 106 may represent the portion of LC panel 102 that is visible to a user's left eye and right eye, respectively. BLU 108 may include a plurality of electrical components that generate light. In some examples, BLU may include a left backlight 110 and a right backlight 112. Backlights 110 and 112 may each include, for example, an array of light-emitting diodes, an electroluminescent element, a cold cathode fluorescent lamp, a hot cathode fluorescent lamp, an external electrode fluorescent lamp, and/or an array of laser emitting diodes, without limitation.

Temperature sensor 114 may represent any sensor capable of measuring the temperature of all or a portion of LC panel 102 and/or the LC material contained within LC panel 102. In some examples, temperature sensor 114 may measure a temperature of left side 104 and/or a temperature of right side 106. In some embodiments, temperature sensor 114 may measure environmental temperatures (i.e., temperatures of the environment surrounding LC panel 102) to estimate temperatures of LC panel 102 and/or the LC material contained within LC panel 102. For example, temperature sensor 114 may measure temperatures at one or more locations within a display device within which LC panel is incorporated (e.g., head-mounted-display device 202 in FIG. 2).

Display driver 116 may include any suitable circuitry for driving pixel elements of LC panel 102 and/or controlling BLU 108. For example, display driver 116 may include at least one display driver integrated circuit (IC). In some examples, display driver 116 may include timing controller (TCON) circuitry that receives commands and/or imaging data and generates horizontal and vertical timing signals for thin-film-transistors (TFTs) of LC panel 102 and/or timing signals for backlights 110 and 112. In some embodiments, display driver 116 may be mounted on an edge of a TFT substrate of LC panel 102 and electrically connected to scan lines and data lines of LC panel 102. As illustrated in FIG. 1, display driver 116 may include one or more modules for performing one or more tasks. As will be explained in greater detail below, display driver 116 may include a data module 118, a temperature-reading module 120, an estimating module 122, and an illuminating module 124. Although illustrated as separate elements, one or more of the modules in FIG. 1 may represent portions of a single module or application.

Figure 2:
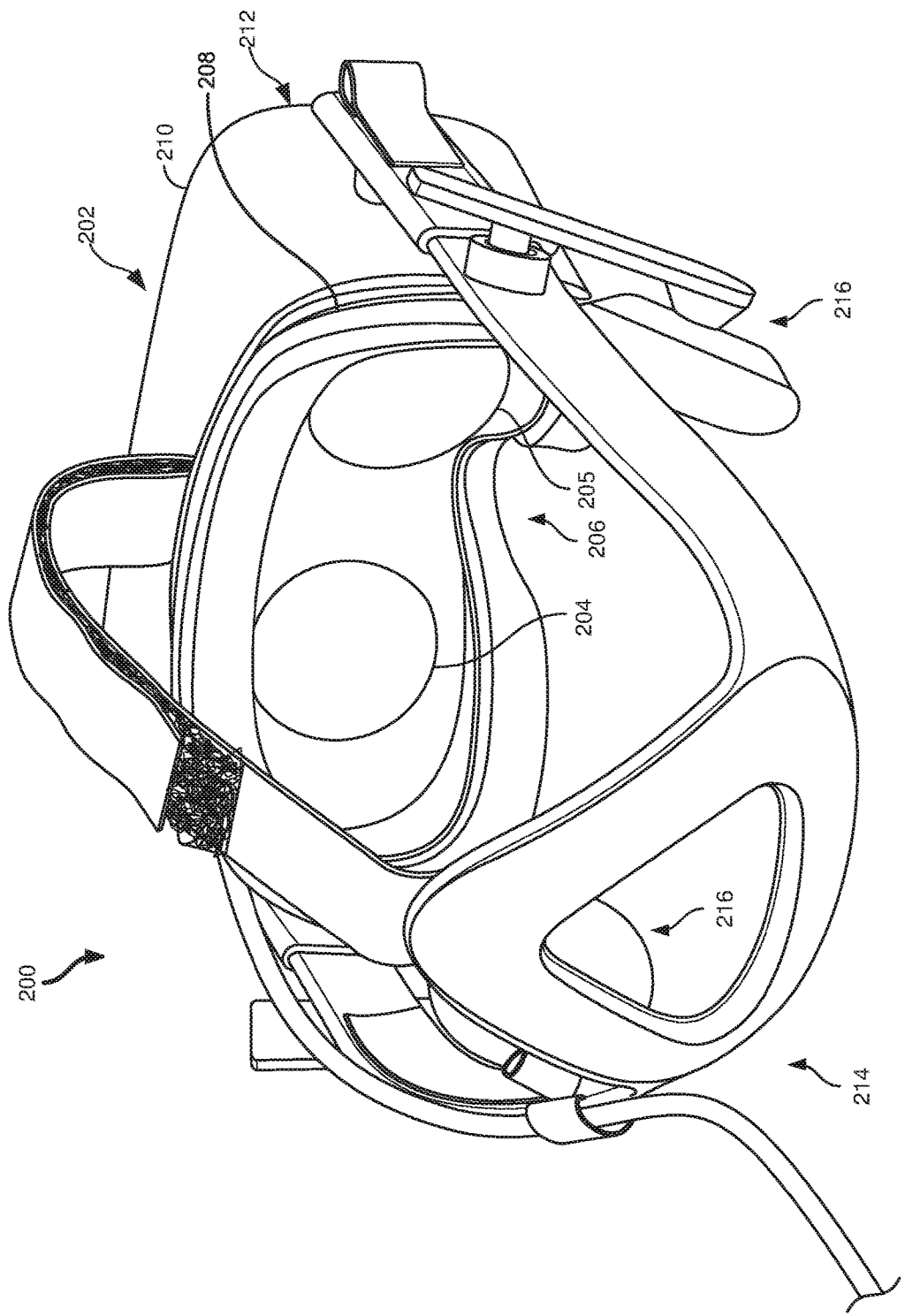
FIG. 2 is a perspective view of an exemplary head-mounted display system in accordance with some embodiments.

Example display system 100 in FIG. 1 may be implemented and/or configured in a variety of ways. For example, as shown in FIG. 2, all or a portion of example display system 100 may represent portions of example head-mounted display system 200. Additionally or alternatively, display system 100 may be utilized in and/or in conjunction with any suitable electronic display device, such as, for example, a television, a computer monitor, a laptop monitor, a tablet device, a portable device, such as a cellular telephone (e.g., a smartphone), a wrist-watch device, a pendant device or other wearable or miniature device, a media player, a camera viewfinder, a gaming device, a navigation device, and/or any other type of device including an electronic display, without limitation.

FIG. 2 is a perspective view of a head-mounted display system 200 in accordance with some embodiments. In some embodiments, head-mounted display system 200 may include a head-mounted-display device 202, a facial-interface system 208, a strap assembly 214, and audio subsystems 216. A head-mounted-display device may include any type or form of display device or system that is worn on or about a user's head and displays visual content to the user. Head-mounted-display devices may display content in any suitable manner, including via a display element (e.g., LC panel 102). Head-mounted-display devices may also display content in one or more of various media formats. For example, a head-mounted-display device may display video, photos, and/or computer-generated imagery (CGI). Head-mounted-display device 202 may include a display housing 210 surrounding various components of head-mounted-display device 202, including lenses 204 and 205 and various electronic components, including backlights and temperature sensors as described herein. Display housing 210 may include a housing back surface 212 and side surfaces surrounding the internal components, and an opening surrounding a viewing region 206 at a front side of display housing 210.

Head-mounted-display devices may provide diverse and distinctive user experiences. Some head-mounted-display devices may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences. Head-mounted-display devices may be configured to be mounted to a user's head in a number of ways. Some head-mounted-display devices may be incorporated into glasses or visors. Other head-mounted-display devices may be incorporated into helmets, hats, or other headwear. Examples of head-mounted-display devices may include OCULUS RIFT, GOOGLE GLASS, VIVE, SAMSUNG GEAR, etc.

In some embodiments, facial-interface system 208 may be configured to comfortably rest against a region of a user's face, including a region surrounding the user's eyes, when head-mounted display system 200 is worn by the user. In these embodiments, facial-interface system 208 may include an interface cushion that is configured to rest against portions of the user's face (e.g., at least a portion of the user's nasal, cheek, temple, and/or forehead facial regions). Facial-interface system 208 may surround viewing region 206, which includes the user's field of vision, allowing the user to look through lenses 204 and 205 of head-mounted-display device 202 without interference from outside light while the user is wearing head-mounted display system 200.

Figure 3:
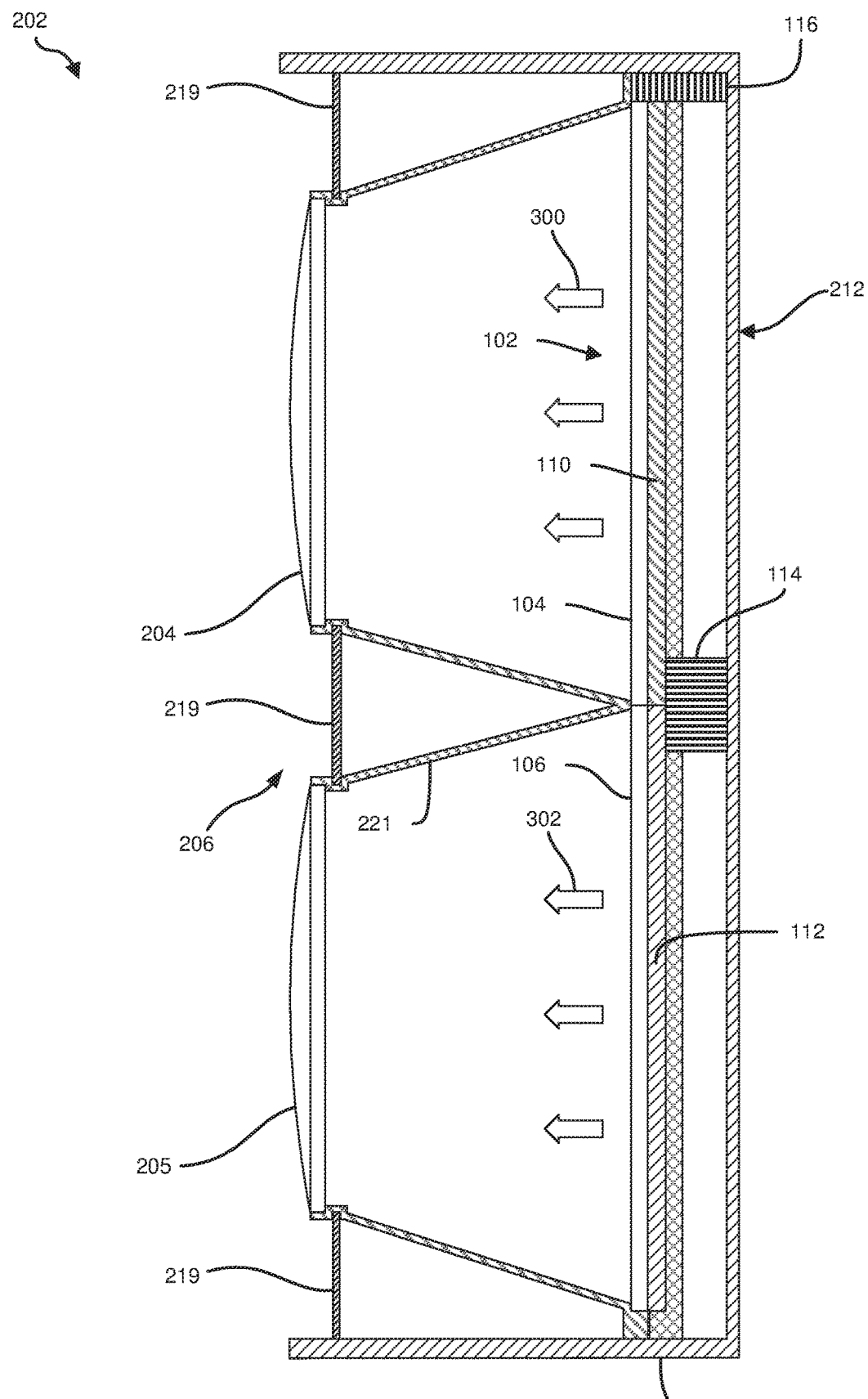
FIG. 3 is a cross-sectional top view of an exemplary head-mounted-display device in accordance with some embodiments.

FIG. 3 shows an exemplary cross-sectional top view of head-mounted-display device 202. As shown in this figure, LC panel 102, BLU 108, temperature sensor 114, and display driver 116 may be disposed within display housing 210 of head-mounted-display device 202. LC panel 102 may be disposed within display housing 210 relative to lenses 204 and 205 such that images produced by a display region of LC panel 102 are visible to a user through lenses 204 and 205. As shown, LC panel 102 may be positioned and oriented in display housing 210 such that a front surface of LC panel 102 faces towards lenses 204 and 205. As shown, left backlight 110 may be positioned behind left side 104 of LC panel 102, and right backlight 112 may be positioned behind right side 106 of LC panel 102. As such, light 300 emitted from left backlight 110 through left side 104 of LC panel 102 may be visible to a user's left eye, and light 302 emitted from right backlight 112 through right side 106 of LC panel 102 may be visible to the user's right eye.

Figure 4A:
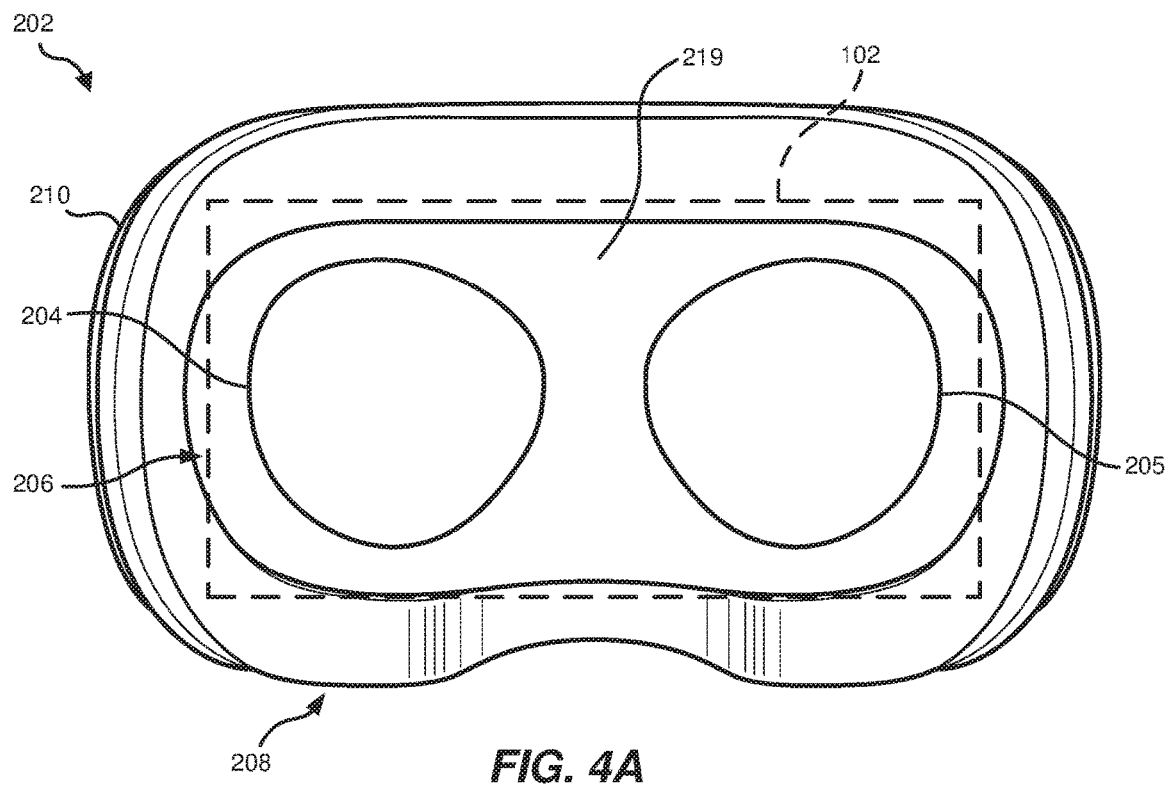
FIG. 4A is a front view of an exemplary head-mounted-display device in accordance with some embodiments.
Figure 4B:
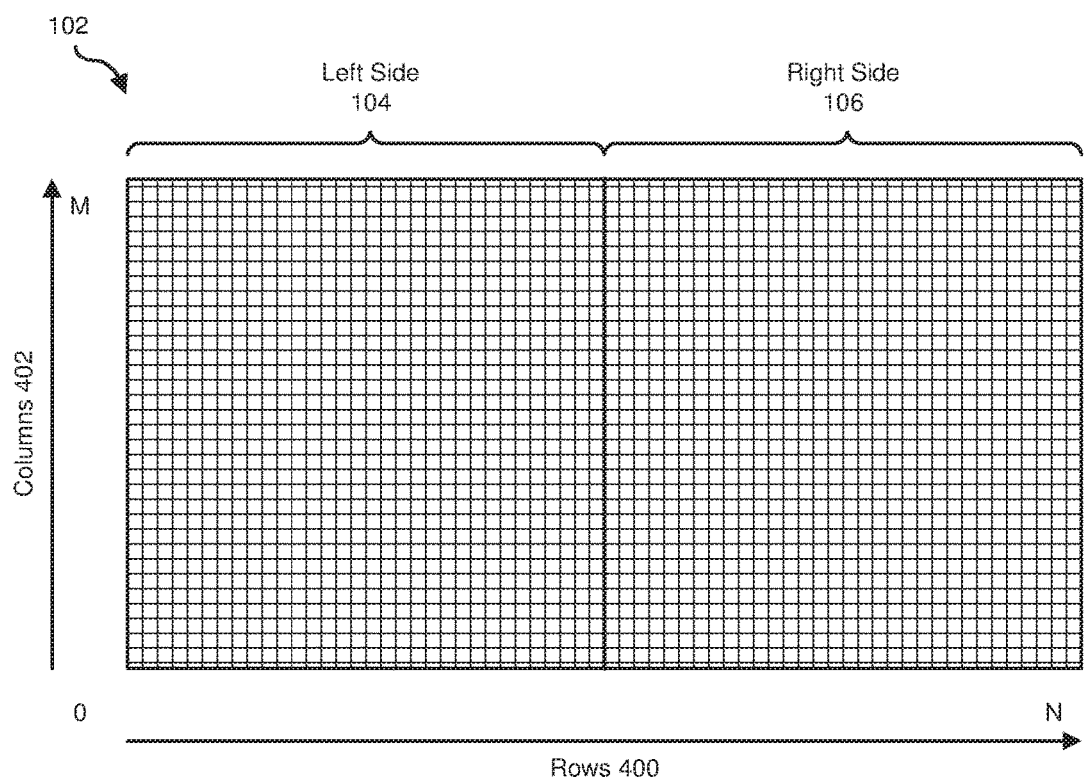
FIG. 4B is a front view of an exemplary LC panel in accordance with some embodiments.

FIGS. 4A and 4B respectively show front views of head-mounted-display device 202 and LC panel 102. As shown in FIG. 4A, head-mounted-display device 202 may include at least one display, such as LC panel 102, disposed within display housing 210. In some embodiments, distinct portions of LC panel 102 may be visible to each of a user's eyes, with portions visible to each eye being separated by a dividing region 221 (e.g., separate eye cups, a central partition, etc.) extending between lenses 204 and 205 and LC panel 102. Such a configuration may enable distinct images to be presented by LC panel 102 to each of the user's eyes, allowing for 3-dimensional images to be perceived by the user.

As shown in FIG. 4A, head-mounted-display device 202 may also include a light-blocking panel 219 surrounding lenses 204 and 205. Light-blocking panel 219 may, for example, extend between lenses 204 and 205 and surrounding portions of display housing 210. Light-blocking panel 219 may include, for example, a light-absorbing material (e.g., a dark polymeric and/or fabric material) that masks internal components of head-mounted-display device 202 and that prevents any outside light incidentally entering viewing region 206 (e.g., through a gap between the user's face and facial-interface system 108) from being reflected within viewing region 206. Display housing 210 may include a rigid material, such as a rigid plastic, that supports and protects internal components, such as LC panel 102 and other electronics.

As shown in FIG. 4B, LC panel 102 may include an M×N array of pixel elements (e.g., pixels and/or sub-pixels) that form visible images according to a suitable LCD technology (e.g., fast switching liquid crystal technology). As shown, LC panel 102 may include M pixel-element columns 402 and N pixel-element rows 400. Each pixel element of LC panel 102 may include LC material that changes states (i.e., orientations of liquid crystals) in response to applied currents or voltages. In some examples, images may be displayed via LC panel 102 by driving pixel elements at different currents and/or voltages such that the pixel elements' LC material takes on different states and different amounts of polarization is given to light emitted through each of the pixel elements. A wide variety of visible colors may be produced by combining different amounts of light passed through sub-pixel color regions (e.g., red, green, and/or blue color regions) of a color filter array panel such that a user perceives colors corresponding to the combinations of the sub-pixel colors.

In some embodiments, display driver 116 may display an image via LC panel 102 by sending corresponding input signals to each of rows 400 of LC panel 102, with the input signals being sequentially scanned along rows 400 from row 0 to row N. These input signals may set LC material at each of rows 400 to new states suitable for displaying the image. Display driver 116 may initiate an illumination of a portion of rows 400 after its LC material has completely transitioned to the new states as described below. For example, display driver 116 may initiate an illumination of backlight 110 to illuminate left side 104 after its LC material has completely transitioned and may initiate an illumination of backlight 112 to illuminate right side 106 after its LC material has completely transitioned.

Figure 5:
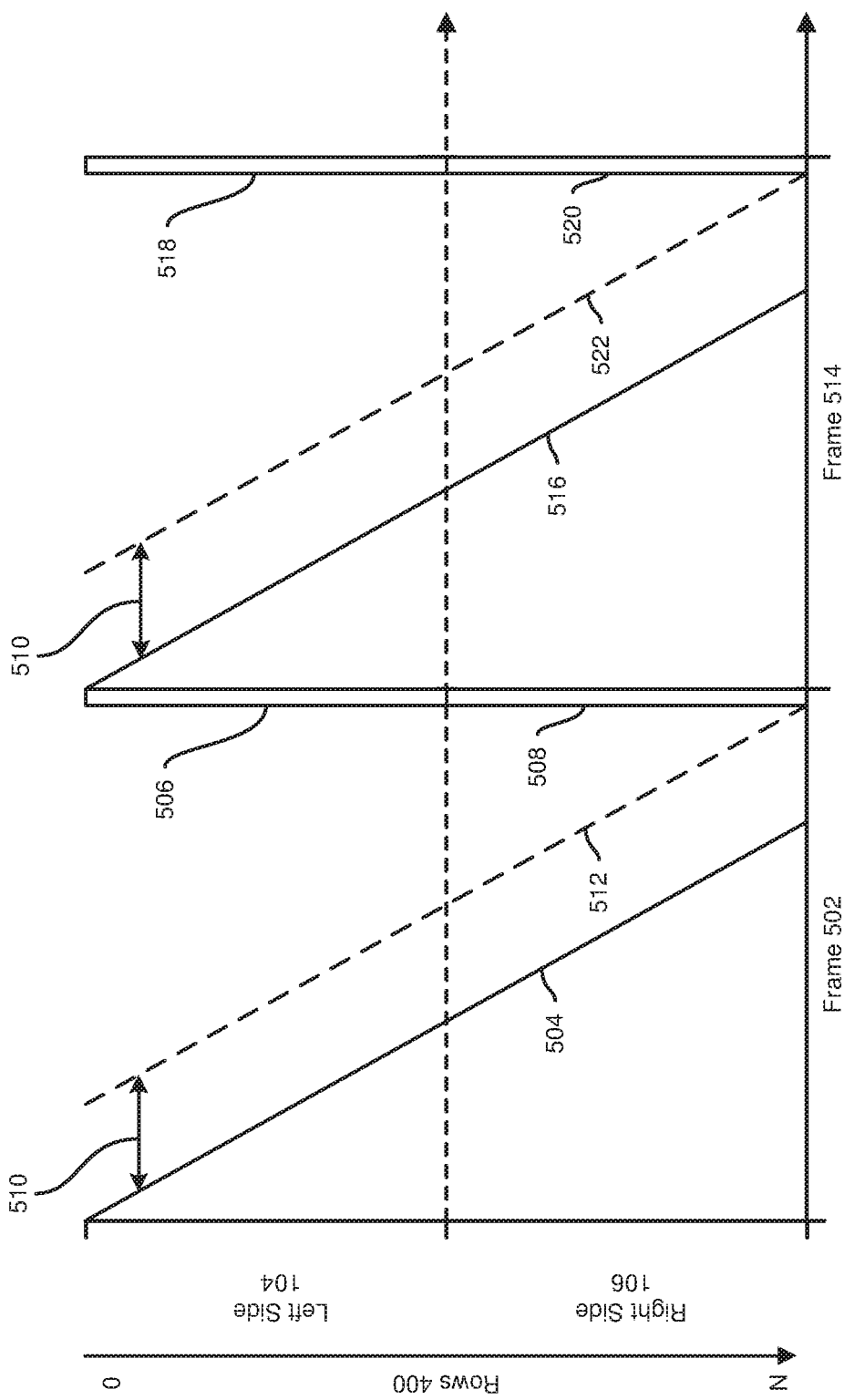
FIG. 5 is a timing diagram illustrating exemplary data scans and LC transitions of an exemplary LC panel in accordance with some embodiments.

As shown in FIG. 5, display driver 116 may display an image during frame period 502 by scanning corresponding input signals 504 to rows 400 of LC panel 102, with input signals 504 being sequentially scanned along rows 400 from row 0 to row N, prior to initiating an illumination 506 of backlight 110 corresponding to left side 104 of LC panel 102 and an illumination 508 of backlight 112 corresponding to right side 106 of LC panel 102. In this example, the time taken for the LC material contained within LC panel 102 to settle to its new state is represented by transition period 510. Since input signals 504 were sequentially scanned to rows 400, line marker 512 may indicate the time at which the LC material at each of rows 400 had settled into its new state. As shown in FIG. 5, display driver 116 may display an additional image during a subsequent frame period 514 by sending corresponding input signals 516 to each of rows 400 of LC panel 102, with input signals 516 being sequentially scanned along rows 400 from row 0 to row N, prior to initiating an additional illumination 518 of backlight 110 and an additional illumination 520 of backlight 112. Since input signals 516 were sequentially scanned to rows 400, line marker 522 may indicate the time at which the LC material at each of rows 400 has completed settled or transitioned.

Figure 6:
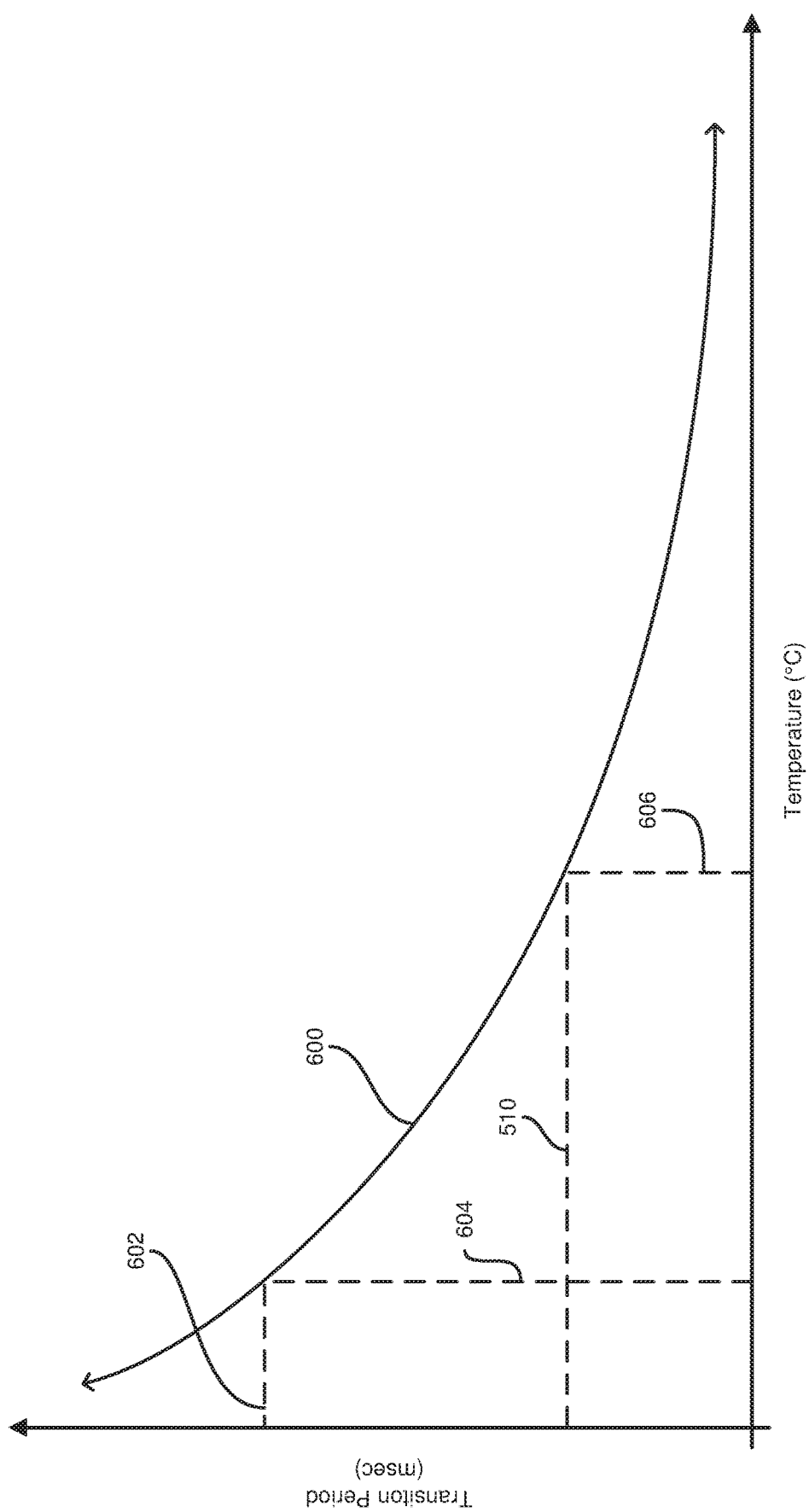
FIG. 6 is a graph diagram illustrating an exemplary LC response curve of an exemplary LC panel.

As mentioned above, the time taken for liquid crystal material to change states may be temperature sensitive. Typically, when liquid crystals become colder, the liquid crystals' response times generally become longer and longer. FIG. 6 illustrates an example response curve 600 for the LC material found in LC panel 102. As shown, transition periods for state transitions may be longer when the LC material is cold. In this example, period 602 may be the time taken for state transitions at temperature 604. As the LC material warms, the response times of the state transitions may gradually quicken. In the example shown, period 510 may be the time taken for state transitions at temperature 606.

With conventional LC panels, static timings for backlight illuminations are often used, and backlights are typically set to illuminate once per frame period. At normal operating temperatures, data scan out and/or LC material transitions will likely occur before backlights are set to illuminate, for example as described in connection with FIG. 5. However, since the time taken for the transitioning of LC material from one state to another may be temperature sensitive, statically-timed backlight illuminations can occur during data scan out and/or LC material transitions, which may result in display artifacts such as motion blur or double images. Since the rows of pixel elements of an LC panel that receive input signals toward the end of a frame period have less time to change their liquid crystal states than other pixel elements of the LC panel, image inconsistencies, such as blurring and/or double images, may be more readily apparent to a user in rows corresponding to the end of such frame periods.

Figure 7:
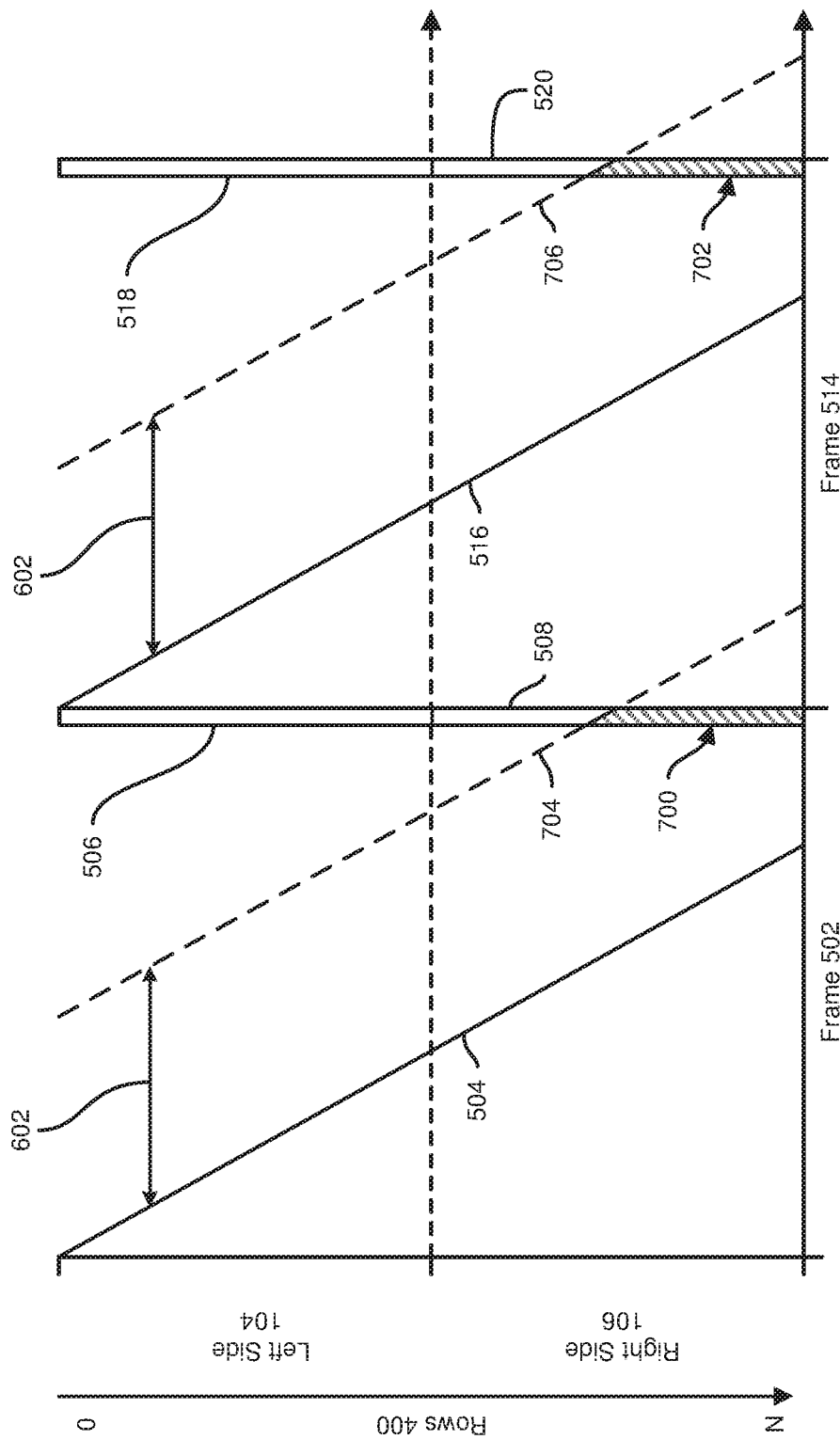
FIG. 7 is a timing diagram illustrating exemplary data scans, LC transitions, and illumination periods of an exemplary LC panel in accordance with some embodiments.

FIG. 7 illustrates exemplary display artifacts 700 and 702 that may occur when static backlight timings are used. In this example, input signals 504 and 516 are scanned to each of rows 400 of LC panel 102 as shown in FIG. 5, and backlights 110 and 112 are illuminated at the same times as shown in FIG. 5 (i.e., immediately before the end of each frame period). However, in this example, the temperature of LC panel 102 may be temperature 604, and the corresponding transition period for the LC material contained in LC panel 102 may be period 602. Since input signals 504 and 516 were sequentially scanned to rows 400, line markers 704 and 706 indicate the times at which the LC material at each of rows 400 had settled. As can be seen in this example, illuminations 508 and 520 of backlight 112 occurred while rows of pixel elements contained on right side 106 of LC panel 102 were changing state, which results in the occurrences of display artifacts 700 and 702.

Figure 8:
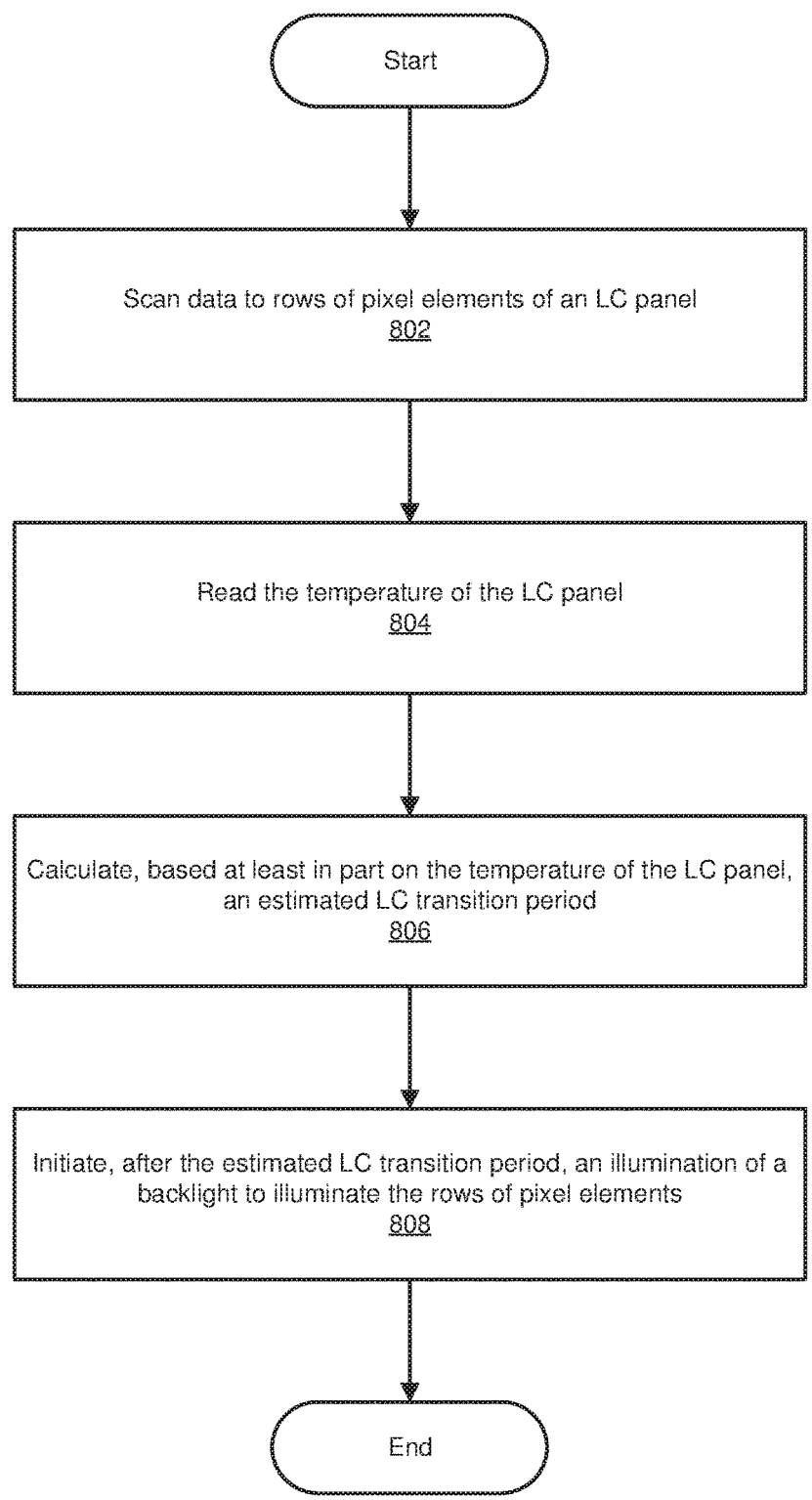
FIG. 8 is a flow diagram of an exemplary method for variably illuminating an LC panel based on temperature measurements in accordance with some embodiments.

FIG. 8 is a flow diagram of an example computer-implemented method 800 for variably illuminating LCDs based on LC panel temperature measurements in order to prevent display artifacts (e.g., display artifacts 700 and 702 in FIG. 7). The steps shown in FIG. 8 may be performed by any suitable computer-executable code and/or computing system, including display system 100 in FIG. 1, head-mounted-display device 202 in FIG. 2, and/or variations or combinations of one or more of the same. In one example, each of the steps shown in FIG. 8 may represent an algorithm whose structure includes and/or is represented by multiple sub-steps, examples of which will be provided in greater detail below.

As illustrated in FIG. 8, at step 802, one or more of the apparatus or systems described herein may scan data to rows of pixel elements of an LC panel. For example, data module 118 may, as part of display driver 116, scan data to rows 400 of LC panel 102.

Figure 9:
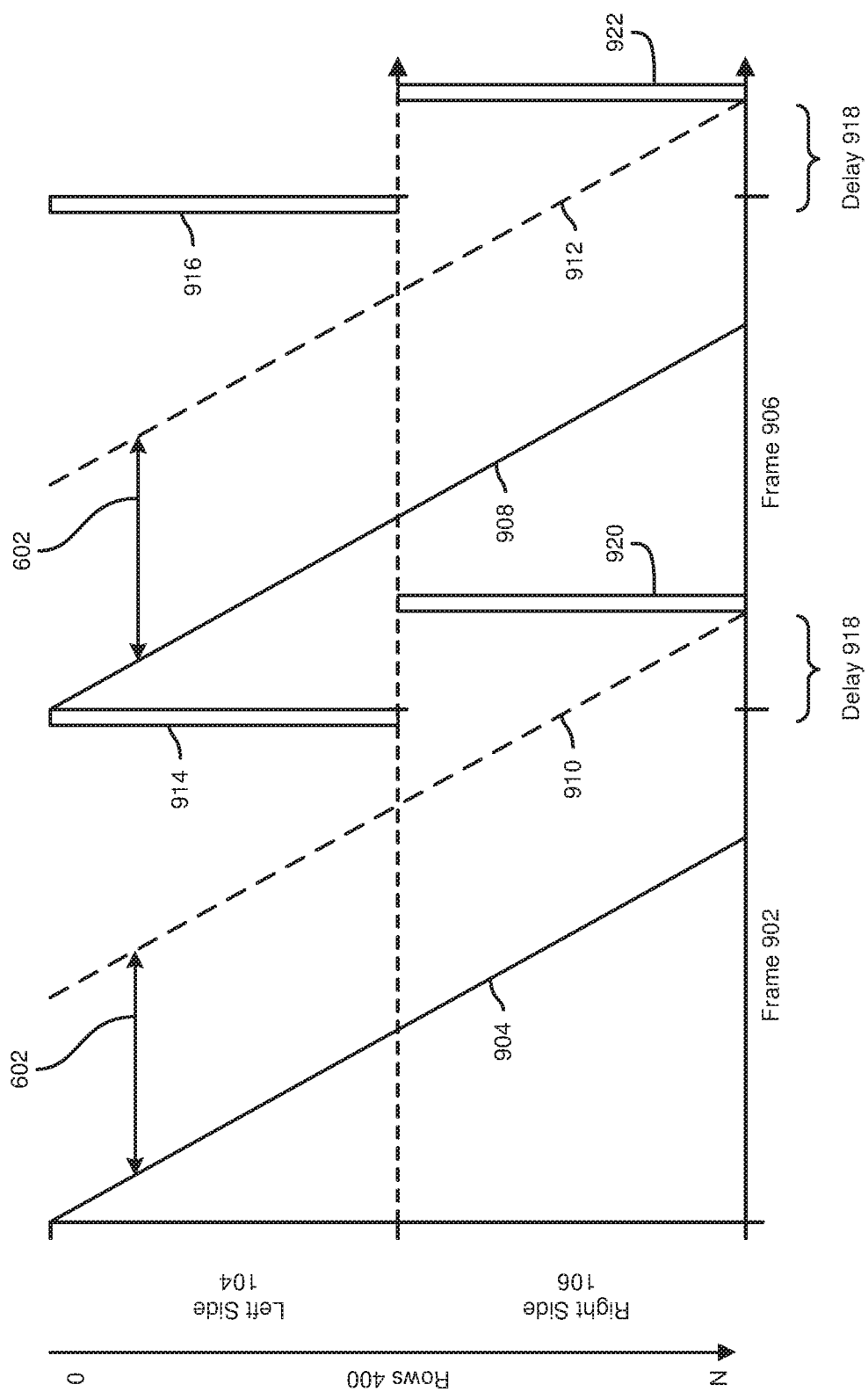
FIG. 9 is a timing diagram illustrating exemplary data scans, LC transitions, and illumination periods of an exemplary LC panel in accordance with some embodiments.

In some examples, data module 11.8 may scan data to rows of pixel elements of a cold liquid crystal panel. FIG. 9 illustrates exemplary data scans, LC transitions, and illumination periods of an exemplary cold LC panel. As shown in FIG. 9, data module 11.8 may use LC panel 102 to display a first image during frame period 902 by scanning corresponding input signals 904 to rows 400 of LC panel 102, data module 118 may then use LC panel 102 to display a second image during a subsequent frame period 906 by sending corresponding input signals 908 to each of rows 400 of LC panel 102. In this example, the time taken for the LC material contained within LC panel 102 to settle is represented by transition period 602. Since input signals 904 and 908 are sequentially scanned to rows 400, line markers 910 and 912 may indicate the time at which the LC material at each of rows 400 has completely settled or transitioned for displaying the first and second image, respectively.

Figure 10:
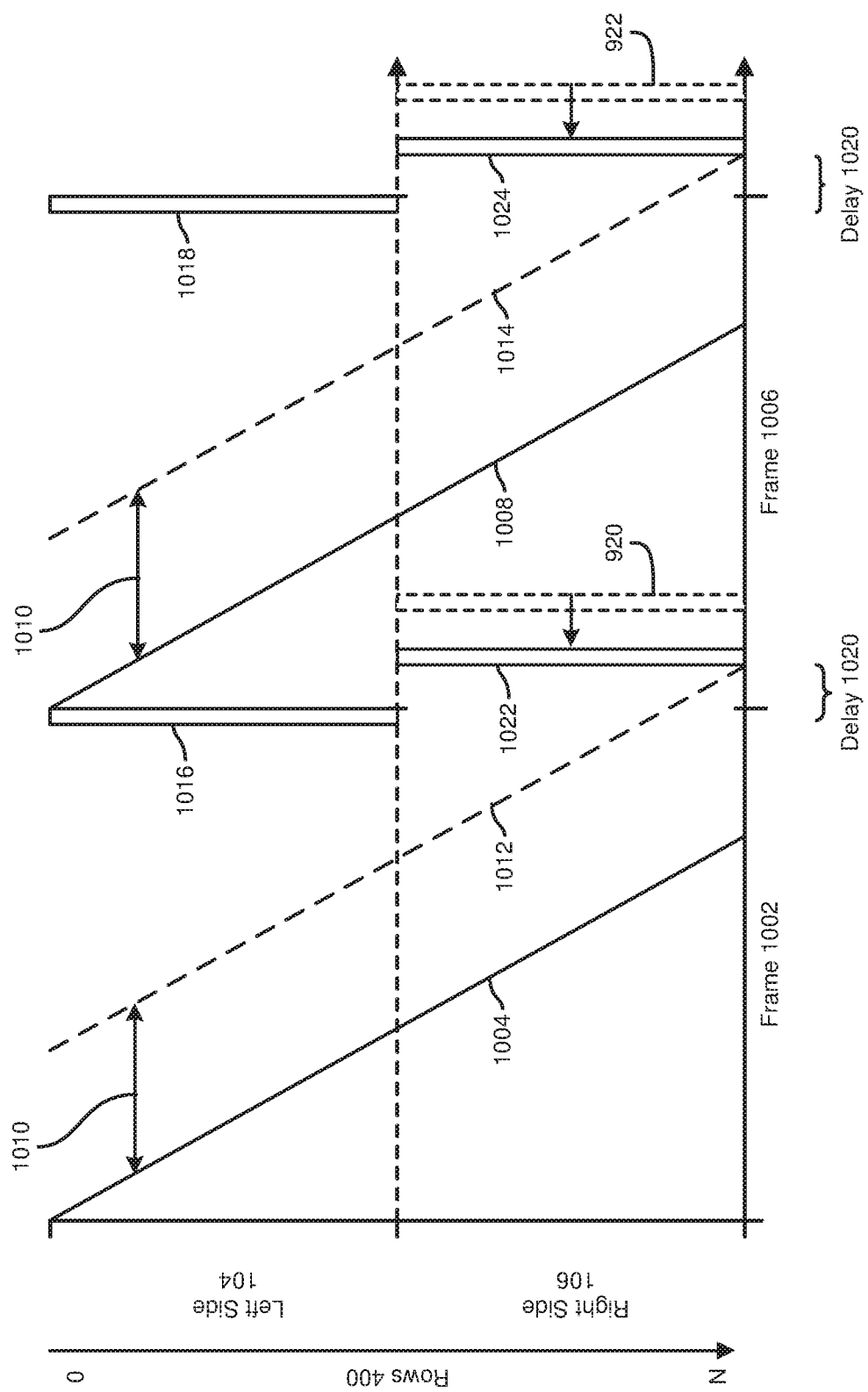
FIG. 10 is a timing diagram illustrating exemplary data scans, LC transitions, and illumination periods of an exemplary LC panel in accordance with some embodiments.

In some examples, data module 118 may scan data to rows of pixel elements of a warming liquid crystal panel. FIG. 10 illustrates exemplary data scans, LC transitions, and illumination periods of an exemplary warming LC panel. As shown in FIG. 10, data module 118 may use LC panel 102 to display a first image during frame period 1002 by scanning corresponding input signals 1004 to rows 400 of LC panel 102, data module 118 may then use LC panel 102 to display a second image during a subsequent frame period 1006 by sending corresponding input signals 1008 to each of rows 400 of LC panel 102. In this example, the time taken for the LC material contained within LC panel 102 to settle is represented by transition period 1010. Since input signals 1004 and 1008 are sequentially scanned to rows 400, line markers 1012 and 1014 may indicate the time at which the LC material at each of rows 400 has completely settled or transitioned for displaying the first and second image, respectively.

Figure 11:
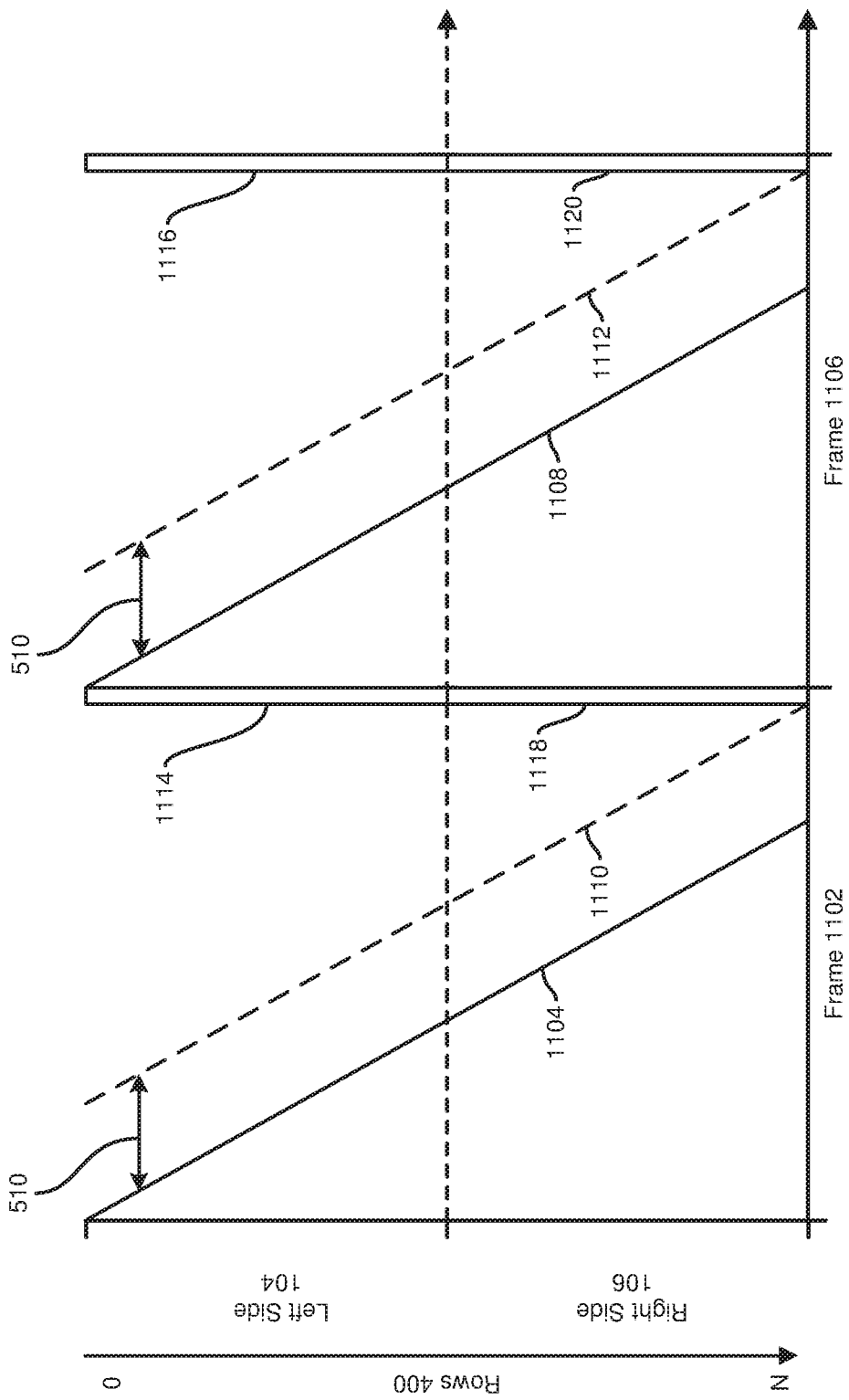
FIG. 11 is a timing diagram illustrating exemplary data scans, LC transitions, and illumination periods of an exemplary LC panel in accordance with some embodiments.

In some examples, data module 118 may scan data to rows of pixel elements of a liquid crystal panel that is running near or at its normal operating temperature. FIG. 11 illustrates exemplary data scans, LC transitions, and illumination periods of an exemplary LC panel that is running near or at its normal operating temperature. As shown in FIG. 11, data module 118 may use LC panel 102 to display a first image during frame period 1102 by scanning corresponding input signals 1104 to rows 400 of LC panel 102, data module 118 may then use LC panel 102 to display a second image during a subsequent frame period 1106 by sending corresponding input signals 1108 to each of rows 400 of LC panel 102. In this example, the time taken for the LC material contained within LC panel 102 to settle is represented by transition period 510. Since input signals 1104 and 1108 are sequentially scanned to rows 400, line markers 1110 and 1112 may indicate the time at which the LC material at each of rows 400 has completely settled or transitioned for displaying the first and second image, respectively.

At step 804, one or more of the apparatus or systems described herein may read, from a temperature sensor configured to measure a temperature of the liquid crystal panel, the temperature of the liquid crystal panel. For example, temperature-reading module 120 may, as part of display driver 116, read the temperature of LC panel 102 from temperature sensor 114. In some examples, temperature-reading module 120 may continuously or periodically read the temperature of LC panel 102 from temperature sensor 114. For example, temperature-reading module 120 may read the temperature of LC panel 102 from temperature sensor 114 at a suitable predetermined interval (e.g., once every frame, second, or minute).

At step 806, one or more of the apparatus or systems described herein may calculate, based at least in part on the temperature of the liquid crystal panel, an estimated LC transition period. For example, estimating module 122 may, as part of display driver 116 calculate an estimated transition period for LC transitions of LC panel 102 based on a temperature reading from temperature sensor 114.

In some examples, estimating module 122 may continuously estimate a transition period for each transition of LC panel 102. Additionally or alternatively, estimating module 122 may periodically calculate an estimated transition period (e.g., any time a new temperature for LC panel 102 is acquired). In some examples, estimating module 122 may update estimated transition periods more or less frequently based on the temperature of an LC panel. For example, estimating module 122 may estimate transition periods for an LC panel more often when the LC panel is cold and less often as it reaches its optimal operating temperature. Estimating module 122 may estimate periods for LC material state transitions in any suitable manner. In one example, estimating module 122 may estimate periods for LC material state transitions for certain measured temperatures using an appropriate lookup table or response curve (e.g., response curve 600 in FIG. 6).

At step 808, one or more of the apparatus or systems described herein may initiate, after the estimated transition period, an illumination of a backlight to illuminate the rows of pixel elements. For example, illuminating module 124 may, as part of display driver 116, initiate an illumination of backlight 110 to illuminate left side 104 after all of the pixel elements of left side 104 of LC panel 102 have completely transitioned to a new state. Similarly, illuminating module 124 may, as part of display driver 116, initiate an illumination of backlight 112 to illuminate right side 106 after all of the pixel elements of right side 106 of LC panel 102 have completely transitioned to a new state.

In some examples, illuminating module 124 may determine when to illuminate backlights by (1) identifying a predetermined or desired time (or rate) for illuminating the backlights, which may be based on frame periods (or rates), and (2) using the estimated transition periods calculated at step 806 to determine if any delay should be added to the predetermined or desired time so that backlights are not illuminated when any portion of an LC panel is still undergoing data scanning or LC transitions. In some examples, the time at which data is scanned out to any row of an LC panel may be regular. In these examples, illuminating module 124 may determine when all of the LC material in a portion of an LC panel is likely to have completely transitioned to a new state by adding the estimated transition period calculated at step 806 to the time at which data is scanned to the last row of the portion.

FIGS. 9-11 illustrate how illuminating module 124 may determine when to illuminate backlight 110 and 112 to respectively illuminate left side 104 and right side 106 of LC panel 102. In these examples, it may be desired that backlight 110 and backlight 112 are illuminated simultaneously at the end of each frame period (e.g., as shown in FIG. 11). FIG. 9 illustrates how illuminating module 124 may determine when to illuminate backlight 110 and 112 when LC panel is cold and the estimated transition period for its LC material is equal to period 602. In this example, illuminating module 124 may use estimated transition period 602 to determine that all of the LC material in left side 104 will likely be completely transitioned by the desired illumination time. As such, illuminating module 124 may initiate illuminations 914 and 916 of backlight 110 at the desired illumination time, as shown. In this example, illuminating module 124 may use estimated transition period 602 to determine that illuminations 920 and 922 should be initiated after a delay 918 is added to the desired illumination time so that all of the LC material in right side 106 will be completely transitioned when illuminations 920 and 922 occur, as shown.

FIG. 10 illustrates how illuminating module 124 may determine when to illuminate backlight 110 and 112 when LC panel has begun to warm up and the estimated transition period for its LC material is equal to period 1010. In this example, illuminating module 124 may use estimated transition period 1010 to determine that all of the LC material in left side 104 will likely be completely transitioned by the desired illumination time. As such, illuminating module 124 may initiate illuminations 1016 and 1018 of backlight 110 at the desired illumination time, as shown. In this example, illuminating module 124 may use estimated transition period 1010 to determine that illuminations 1022 and 1024 should be initiated after a delay 1020 (e.g., a shorter delay than delay 918 in FIG. 9) is added to the desired illumination time so that all of the LC material in right side 104 will be completely transitioned when illuminations 1022 and 1024 occur, as shown.

FIG. 11 illustrates how illuminating module 124 may determine when to illuminate backlight 110 and 112 when LC panel has warmed up to its normal operating temperature and the estimated transition period for its LC material is equal to period 510. In this example, illuminating module 124 may use estimated transition period 510 to determine that all of the LC material in left side 104 and right side 106 will likely be completely transitioned by the desired illumination time. As such, illuminating module 124 may initiate illuminations 1114 and 1116 of backlight 110 and illuminations 1118 and 1120 of backlight 112 at the desired illumination time, as shown.

As discussed throughout the instant disclosure, the disclosed apparatuses, systems, and methods may provide one or more advantages over traditional display apparatuses, systems, and methods. For example, embodiments of the instant disclosure may vary LCD illumination timings to prevent display artifacts. Temperature sensors may be used to determine correct illumination times and rates so that display artifacts can be reduced or eliminated. In some embodiments, an LCD (e.g., an LCD of a HMD) may include (1) an LC panel with two sides and (2) two backlights (e.g., one backlight for each side of the LC panel) that are capable of variable illumination. In some examples, the illumination times and rates for the two backlights may be determined and set independently. At colder operational temperatures, embodiments of the instant disclosure may delay the illumination of one backlight relative to the other to prevent display artifacts. As the operational temperature of the LCD rises, the delay may be shortened until both sides of the display are illuminated simultaneously. Such systems may enhance user experiences while using LCD devices, such as head-mounted-display devices, in a variety of environments, including colder environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a temperature measurement of an LC panel, transform the temperature measurement into an estimate of a transition or settling period for the LC panel, output a result of the transformation to initiate an illumination of a backlight of the LC panel, and use the result of the transformation to display images via the LC panel without display artifacts even when the LC panel is below its optimal operating temperature. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A head-mounted display device comprising:
   a liquid crystal panel comprising first rows of pixel elements and second rows of pixels elements, the first rows and the second rows each comprising liquid crystal material capable of transitioning between two or more states;
   a first backlight coupled to the liquid crystal panel behind the first rows, the first backlight being configured to emit light through the first rows towards a user's eye;
   a second backlight coupled to the liquid crystal panel behind the second rows, the second backlight being configured to emit light through the second rows towards the user's other eye;
   a temperature sensor configured to measure a temperature of the liquid crystal panel; and
   a display driver configured to:
      scan three-dimensional data to the liquid crystal panel by:
         scanning a first-eye portion of the three-dimensional data to the first rows, wherein the display driver scans the first-eye portion to the first rows such that the liquid crystal material of the first rows makes a first transition between the two or more states; and
         scanning, after scanning the first-eye portion to the first rows, a second-eye portion of the three-dimensional data to the second rows, wherein the display driver scans the second-eye portion to the second rows such that the liquid crystal material of the second rows makes a second transition between the two or more states;
      initiate, before the end of the second transition, an illumination of the first backlight to illuminate the first rows;
      read, from the temperature sensor, the temperature of the liquid crystal panel;
      calculate, based at least in part on the temperature of the liquid crystal panel, an estimated transition period for the second transition; and
      initiate, after the estimated transition period and the illumination of the first backlight, an illumination of the second backlight to illuminate the second rows.

2. The head-mounted display device of claim 1, wherein:
   the display driver scans the three-dimensional data to the liquid crystal panel during a frame period; and
   the display driver initiates the illumination of the first backlight at the end of the frame period.

3. The head-mounted display device of claim 2, wherein the display driver reads the temperature of the liquid crystal panel during the frame period.

4. The head-mounted display device of claim 2, wherein:
   the display driver is further configured to:
      scan, during a subsequent frame period, additional three-dimensional data to the liquid crystal panel by:
         scanning an additional first-eye portion of the additional three-dimensional data to the first rows, wherein the display driver scans the additional first-eye portion to the first rows such that the liquid crystal material of the first rows makes a third transition between the two or more states; and
         scanning, after scanning the additional first-eye portion to the first rows, an additional second-eye portion of the additional three-dimensional data to the second rows, wherein the display driver scans the additional second-eye portion to the second rows such that the liquid crystal material of the second rows makes a fourth transition between the two or more states;
      initiate, during the subsequent frame period, an additional illumination of the first backlight to illuminate the first rows;
      read, from the temperature sensor, an updated temperature of the liquid crystal panel;
      calculate, based at least in part on the updated temperature of the liquid crystal panel, an additional estimated transition period for the fourth transition; and
      initiate, after the additional estimated transition period, an additional illumination of the second backlight to illuminate the second rows.

5. The head-mounted display device of claim 4, wherein the display driver reads the updated temperature of the liquid crystal panel during the subsequent frame period.

6. The head-mounted display device of claim 4, wherein:
   the end of the second transition occurs after the frame period;
   the display driver is configured to initiate the illumination of the second backlight after the estimated transition period by:
      calculating, based at least in part on the temperature of the liquid crystal panel, an amount of time between the illumination of the first backlight and the end of the estimated transition period; and
      delaying the illumination of the second backlight for the amount of time after the illumination of the first backlight.

7. The head-mounted display device of claim 6, wherein the display driver is further configured to
   initiate the additional illumination of the second backlight by:
      calculating an additional amount of time between the additional illumination of the first backlight and the end of the additional estimated transition period, the additional amount of time being less than the amount of time; and delaying the additional illumination of the second backlight for the additional amount of time after the additional illumination of the first backlight.

8. The head-mounted display device of claim 4, wherein:
the end of the fourth transition occurs during the subsequent frame period; and
the display driver is configured to initiate the additional illumination of the second backlight by:
determining, based at least in part on the updated temperature of the liquid crystal panel, that the end of the additional estimated transition period will occur before the additional illumination of the first backlight; and
causing the additional illumination of the second backlight to occur simultaneous with the additional illumination of the first backlight.

9. The head-mounted display device of claim 1, wherein the three-dimensional data comprises stereo images conveying different perspectives of a virtual-reality experience.

10. The head-mounted display device of claim 1, wherein:
the head-mounted display device further comprises:
a lens for the user's eye; and
an additional lens for the user's other eye;
the liquid crystal panel is coupled to the lens and the additional lens;
the first rows are configured to provide images to the user's eye through the lens;
the second rows are configured to provide additional images to the user's other eye through the additional lens.

11. A computer-implemented method comprising:
scanning three-dimensional data to a liquid crystal panel comprising first rows of pixel elements and second rows of pixels elements by:
scanning a first-eye portion of the three-dimensional data to the first rows;
scanning, after scanning the first-eye portion to the first rows, a second-eye portion of the three-dimensional data to the second rows, wherein:
the first rows and the second rows each comprise liquid crystal material capable of transitioning between two or more states;
a first backlight is coupled to the liquid crystal panel behind the first rows and configured to emit light through the first rows towards a user's eye;
a second backlight is coupled to the liquid crystal panel behind the second rows and configured to emit light through the second rows towards the user's other eye;
scanning the first-eye portion to the first rows causes the liquid crystal material of the first rows to make a first transition between the two or more states; and
scanning the second-eye portion to the second rows causes the liquid crystal material of the second rows to make a second transition between the two or more states;
initiating, before the end of the second transition, an illumination of the first backlight to illuminate the first rows;
reading, from a temperature sensor configured to measure a temperature of the liquid crystal panel, the temperature of the liquid crystal panel;
calculating, based at least in part on the temperature of the liquid crystal panel, an estimated transition period for the second transition; and
initiating, after the estimated transition period and the illumination of the first backlight, an illumination of the second backlight to illuminate the second rows.

12. The computer-implemented method of claim 11, wherein:
the three-dimensional data is scanned to the liquid crystal panel during a frame period; and
the illumination of the first backlight is initiated at the end of the frame period.

13. The computer-implemented method of claim 12, wherein the temperature of the liquid crystal panel is read during the frame period.

14. The computer-implemented method of claim 12, further comprising:
scanning, during a subsequent frame period, additional three-dimensional data to the liquid crystal panel by:
scanning an additional first-eye portion of the additional three-dimensional data to the first rows, wherein scanning the additional first-eye portion to the first rows causes the liquid crystal material of the first rows to make a third transition between the two or more states; and
scanning, after scanning the additional first-eye portion to the first rows, an additional second-eye portion of the additional three-dimensional data to the second rows, wherein scanning the additional second-eye portion to the second rows causes the liquid crystal material of the second rows to make a fourth transition between the two or more states;
initiating, during the subsequent frame period, an additional illumination of the first backlight;
reading, from the temperature sensor, an updated temperature of the liquid crystal panel;
calculating, based at least in part on the updated temperature of the liquid crystal panel, an additional estimated transition period for the fourth transition; and
initiating, after the additional estimated transition period, an additional illumination of the second backlight to illuminate the second rows.

15. The computer-implemented method of claim 14, wherein the updated temperature of the liquid crystal panel is read during the subsequent frame period.

16. The computer-implemented method of claim 14, wherein:
the end of the second transition occurs after the frame period;
initiating the illumination of the second backlight after the estimated transition period comprises:
calculating, based at least in part on the temperature of the liquid crystal panel, an amount of time between the illumination of the first backlight and the end of the estimated transition period; and
delaying the illumination of the second backlight for the amount of time after the illumination of the first backlight.

17. The computer-implemented method of claim 16, wherein
initiating the additional illumination of the second backlight comprises:
calculating an additional amount of time between the additional illumination of the first backlight and the end of the additional estimated transition period, the additional amount of time being less than the amount of time; and
delaying the additional illumination of the second backlight for the additional amount of time after the additional illumination of the first backlight.

18. The computer-implemented method of claim 14, wherein:

the end of the fourth transition occurs during the subsequent frame period; and initiating the additional illumination of the second backlight comprises:

determining, based at least in part on the updated temperature of the liquid crystal panel, that the end of the additional estimated transition period will occur before the additional illumination of the first backlight; and causing the additional illumination of the second backlight to occur simultaneous with the additional illumination of the first backlight.

19. The computer-implemented method of claim 11, wherein the three-dimensional data comprises stereo images conveying different perspectives of a virtual-reality experience.

20. A non-transitory computer-readable medium comprising one or more computer-executable instructions that, when executed by at least one processor of a computing device, cause the computing device to:

scan three-dimensional data to a liquid crystal panel comprising first rows of pixel elements and second rows of pixels elements by:

scanning a first-eye portion of the three-dimensional data to the first rows;

scanning, after scanning the first-eye portion to the first rows, a second-eye portion of the three-dimensional data to the second rows, wherein:

the first rows and the second rows each comprise liquid crystal material capable of transitioning between two or more states;

a first backlight is coupled to the liquid crystal panel behind the first rows and configured to emit light through the first rows towards a user's eye;

a second backlight is coupled to the liquid crystal panel behind the second rows and configured to emit light through the second rows towards the user's other eye;

scanning the first-eye portion to the first rows causes the liquid crystal material of the first rows to make a first transition between the two or more states; and scanning the second-eye portion to the second rows causes the liquid crystal material of the second rows to make a second transition between the two or more states;

initiate, before the end of the second transition, an illumination of the first backlight to illuminate the first rows;

read, from a temperature sensor configured to measure a temperature of the liquid crystal panel, the temperature of the liquid crystal panel;

calculate, based at least in part on the temperature of the liquid crystal panel, an estimated transition period for the second transition; and initiate, after the estimated transition period and the illumination of the first backlight, an illumination of the second backlight to illuminate the second rows.

* * * * *